(12) United States Patent
Goldner et al.

(10) Patent No.: US 9,885,592 B2
(45) Date of Patent: Feb. 6, 2018

(54) FIBER OPTIC BACKSCATTER SENSING SYSTEMS AND METHODS OF OPERATING THE SAME

(71) Applicant: US Seismic Systems, Inc., Chatsworth, CA (US)

(72) Inventors: Eric L. Goldner, Valencia, CA (US); James K. Andersen, Westlake Village, CA (US)

(73) Assignee: Avalon Sciences Ltd., Somerset (GB)

( * ) Notice: Subject to any disclaimer, the term of this patent is extended or adjusted under 35 U.S.C. 154(b) by 0 days.

(21) Appl. No.: 14/798,813

(22) Filed: Jul. 14, 2015

(65) Prior Publication Data

US 2016/0011301 A1  Jan. 14, 2016

Related U.S. Application Data

(60) Provisional application No. 62/024,001, filed on Jul. 14, 2014.

(51) Int. Cl.
  *G01S 7/481* (2006.01)
  *G01D 5/353* (2006.01)

(52) U.S. Cl.
  CPC ..... *G01D 5/35361* (2013.01); *G01D 5/35306* (2013.01)

(58) Field of Classification Search
  CPC ...... E21B 47/123; E21B 47/065; E21B 47/06; E21B 49/087; G01S 7/481; G01S 7/486; G01S 17/02
  See application file for complete search history.

(56) References Cited

U.S. PATENT DOCUMENTS

| | | | |
|---|---|---|---|
| 5,629,515 A * | 5/1997 | Maekawa | G01T 1/20 250/207 |
| 6,233,746 B1 * | 5/2001 | Skinner | E21B 47/06 250/227.18 |
| 6,473,183 B1 | 10/2002 | Tweedu et al. | |
| 7,683,312 B2 | 3/2010 | Goldner et al. | |
| 7,999,946 B2 | 8/2011 | Andersen et al. | |
| 8,401,354 B2 | 3/2013 | Goldner et al. | |
| 8,701,481 B2 | 4/2014 | Andersen et al. | |
| 8,983,287 B2 | 3/2015 | Goldner et al. | |
| 2006/0034559 A1 * | 2/2006 | Arias Vidal | G01L 11/02 385/13 |
| 2011/0191031 A1 * | 8/2011 | Harman | E21B 47/06 702/11 |
| 2011/0320147 A1 * | 12/2011 | Brady | G01V 1/40 702/66 |
| 2012/0227504 A1 | 9/2012 | Goldner et al. | |
| 2012/0257208 A1 * | 10/2012 | Andersen | G01H 9/004 356/477 |

(Continued)

FOREIGN PATENT DOCUMENTS

WO  2015/034858  3/2015

*Primary Examiner* — Marcus Taningco
(74) *Attorney, Agent, or Firm* — Stradley Ronon Stevens & Young, LLP

(57) ABSTRACT

A fiber optic sensing system is provided. The fiber optic sensing system includes: at least one fiber optic transducer; an optical backscatter interrogator for interrogating backscatter optical signals from the at least one fiber optic transducer; and an optical fiber between the optical backscatter interrogator and the at least one fiber optic transducer.

20 Claims, 5 Drawing Sheets

(56) References Cited

U.S. PATENT DOCUMENTS

| | | |
|---|---|---|
| 2012/0257209 A1 | 10/2012 | Andersen et al. |
| 2013/0025375 A1 | 1/2013 | Goldner et al. |
| 2013/0201484 A1 | 8/2013 | Goldner et al. |
| 2014/0105609 A1 | 4/2014 | Andersen et al. |
| 2014/0110124 A1 | 4/2014 | Goldner et al. |
| 2014/0231636 A1 | 8/2014 | Goldner et al. |
| 2014/0246210 A1 | 9/2014 | Andersen et al. |
| 2014/0334824 A1 | 11/2014 | Goldner |
| 2015/0086206 A1 | 3/2015 | Goldner et al. |
| 2015/0131103 A1 | 5/2015 | Goldner et al. |

\* cited by examiner

FIBER OPTIC BACKSCATTER SENSING SYSTEMS AND METHODS OF OPERATING THE SAME

RELATED APPLICATION

The present application claims the benefit of priority to U.S. Provisional Patent Application Ser. No. 62/024,001, filed on Jul. 14, 2014, the content of which is incorporated in this application by reference.

FIELD

This invention relates generally to the field of fiber optic sensing systems, and more particularly, to backscatter interrogator based sensing systems.

BACKGROUND

Traditional interferometric fiber optic sensing systems utilize high sensitivity transducers within optical interferometers coupled with interferometric phase demodulation systems to generate high sensitivity, high linearity, low noise outputs. Recently, interest has been generated in backscatter systems that process scattered optical return from long lengths of optical fiber using a high speed interrogator to produce low sensitivity output that is scalar in nature (highly non-directional) but is extremely inexpensive to produce since the sensor array is simply a long tubed length of optical fiber.

Backscatter systems have some advantages over interferometrically interrogated fiber optics sensing systems, such as cost and reliability (e.g., due to lower parts count). However, such systems have some significant drawbacks including, for example, low sensitivity and output signal fading over time (e.g., leading to time periods of very low signal-to-noise, and reduced performance).

Thus, it would be desirable to provide improved fiber optic sensing systems overcoming deficiencies of the aforementioned systems.

SUMMARY

According to an exemplary embodiment of the present invention, a fiber optic sensing system is provided. The fiber optic sensing system includes: at least one fiber optic transducer; an optical backscatter interrogator for interrogating backscatter optical signals from the at least one fiber optic transducer; and an optical fiber between the optical backscatter interrogator and the at least one fiber optic transducer.

According to another exemplary embodiment of the present invention, a method of operating a fiber optic sensing system is provided. The method includes: (a) providing a fiber optic sensor array including at least one fiber optic transducer for sensing a time varying physical quantity including at least one temperature, pressure, and vibration (e.g., sound, acceleration, etc.); (b) generating an optical signal with an optical backscatter interrogator; and (c) receiving, at the optical backscatter interrogator, a backscatter optical signal from the at least one fiber optic transducer.

The optical signals may be provided as pulses of highly coherent light (e.g., laser light, having a duration between 1-100 nanoseconds, and a repetition rate consistent with only one laser pulse or return scatter pulse travelling in the array/system at one time).

In connection with certain exemplary embodiments of the present invention, samples of the backscattered optical signal are selected for processing in order to determine the value of the physical quantity measured. Samples may be selected, for example, corresponding to light backscattered from the at least one fiber optic transducer based on the optical time of flight and to exclude samples corresponding to light backscattered from the fiber between ones of a plurality of at least one fiber optic transducer.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity purposes. Included in the drawings are the following figures.

DETAILED DESCRIPTION

This invention blends the low cost of a backscatter interrogation (e.g., Rayleigh backscatter interrogation) with a high performance transducer (e.g., for sensing acceleration, pressure; acoustic dynamic pressure, displacement, temperature, strain) to produce a highly directional, high sensitivity, low noise system with a low cost of manufacture due to minimal labor and components. The invention relates to the use of the low intensity light backscattered along optical fibers due to small changes in the refractive index of the fiber that are inherent in all optical fibers.

The combination of backscatter interrogation with optical fiber transducers provides: (1) the benefits of improvement in both scale factor and (in the case of accelerometers) off-axis sensitivity over linear Rayleigh systems (DAS, for example); and (2) improved reliability and lower cost over interferometric systems.

According to certain exemplary embodiments of the present invention, regions of the fiber processed by the interrogator are selected, for example, to process signals from each sensor/transducer region of the array, and to avoid processing of signals between ones of the sensor/transducer regions of the array. For example, in applications such as towed hydrophone arrays and streamers, noise that is otherwise generated in the fiber lengths between transducers may not be processed, and in essence, may be effectively eliminated via software.

Figure 1:
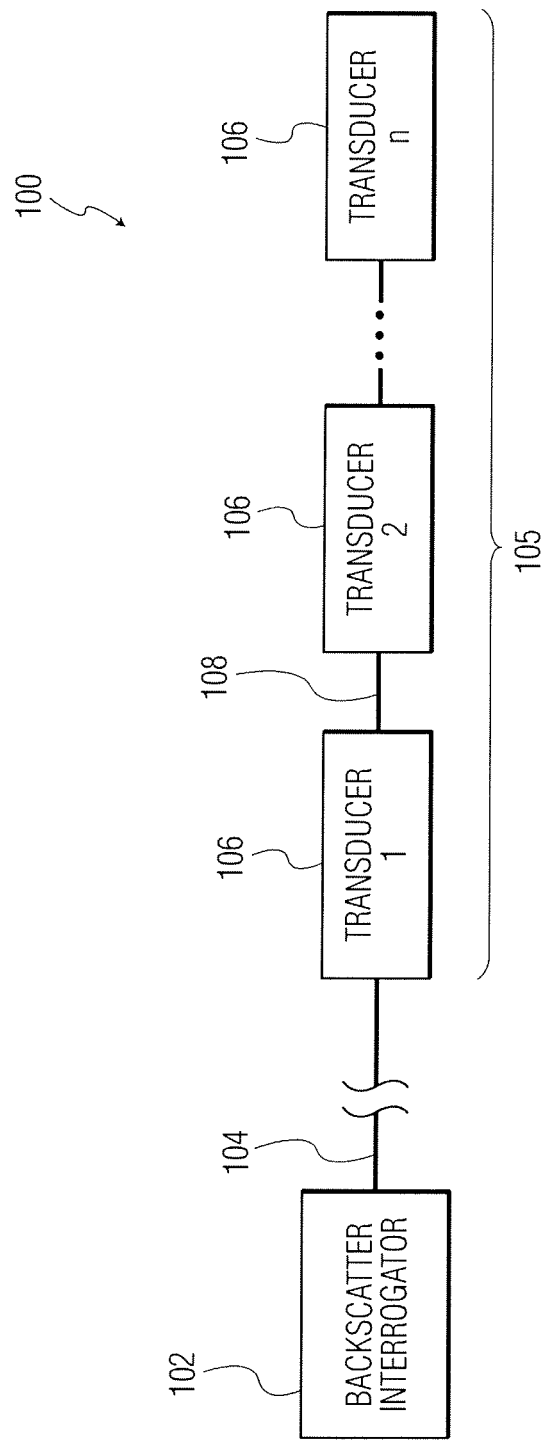
FIG. 1 is a block diagram of a fiber optic sensing system in accordance with an exemplary embodiment of the present invention.

FIG. 1 illustrates fiber optic sensing system 100. System 100 is a backscatter transducer-based system. System 100 includes backscatter interrogator 102 (e.g., a Rayleigh backscatter interrogator) for interrogating backscatter optical signals from fiber optic transducer array 105. Fiber optic transducer array 105 includes a plurality of fiber optic transducers 106 (e.g., where the transducers 106 are labeled as "TRANSDUCER 1", "TRANSDUCER 2", etc., through "TRANSDUCER n"). Backscatter interrogator 102 is optically coupled to fiber optic transducer array 105 through optical lead cable 104 (where lead cable 104 includes at least one optical fiber to provide the optical coupling). Ones of transducers 106 are optically coupled to each other using optical interconnect cable(s) 108 (where interconnect cable 108 includes at least one optical fiber to provide the optical coupling). Backscatter interrogator 102 includes an optical source for providing optical signals to array 105, and an optical receiver for receiving backscatter optical signals from array 105. Pulses of highly coherent light (e.g., laser light) propagate from the optical source of backscatter interrogator 102, through lead cable 104, and to transducer/sensor array 105. Transducers 106 (e.g., wound fiber type transducers) are arranged in a serial configuration, with a single optical fiber path from the proximal end of array 105 to the distal end. Backscatter (e.g., Rayleigh backscatter) occurs along the entire length of optical fiber within the array, and is returned to interrogator 102 as a temporal series of optical pulses. The pulses are received, processed and interpreted by interrogator 102. Interrogator 102 selects samples to be retained for processing (e.g., those corresponding to light scattered within transducers 106), and those which are excluded from processing (e.g., corresponding to light scattered between transducers 106).

Figure 2:
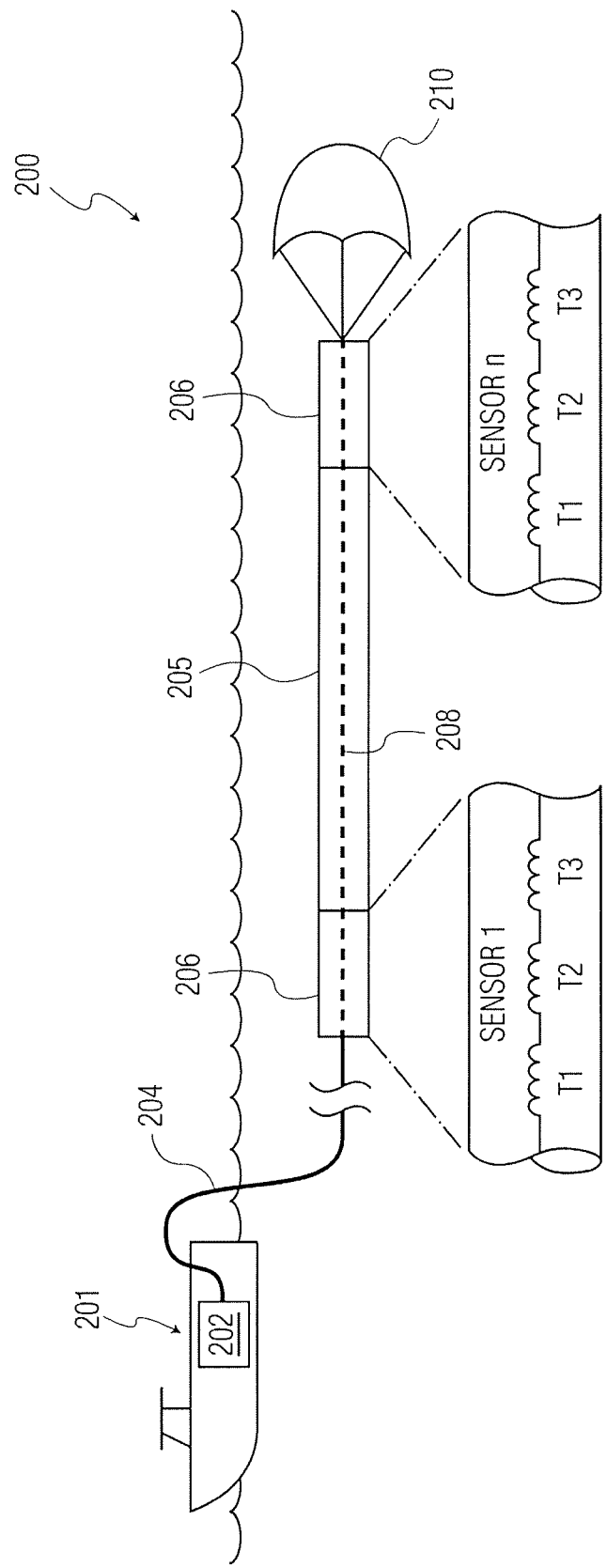
FIG. 2 is a block diagram of a towed marine fiber optic sensing system in accordance with an exemplary embodiment of the present invention.
Figure 3:
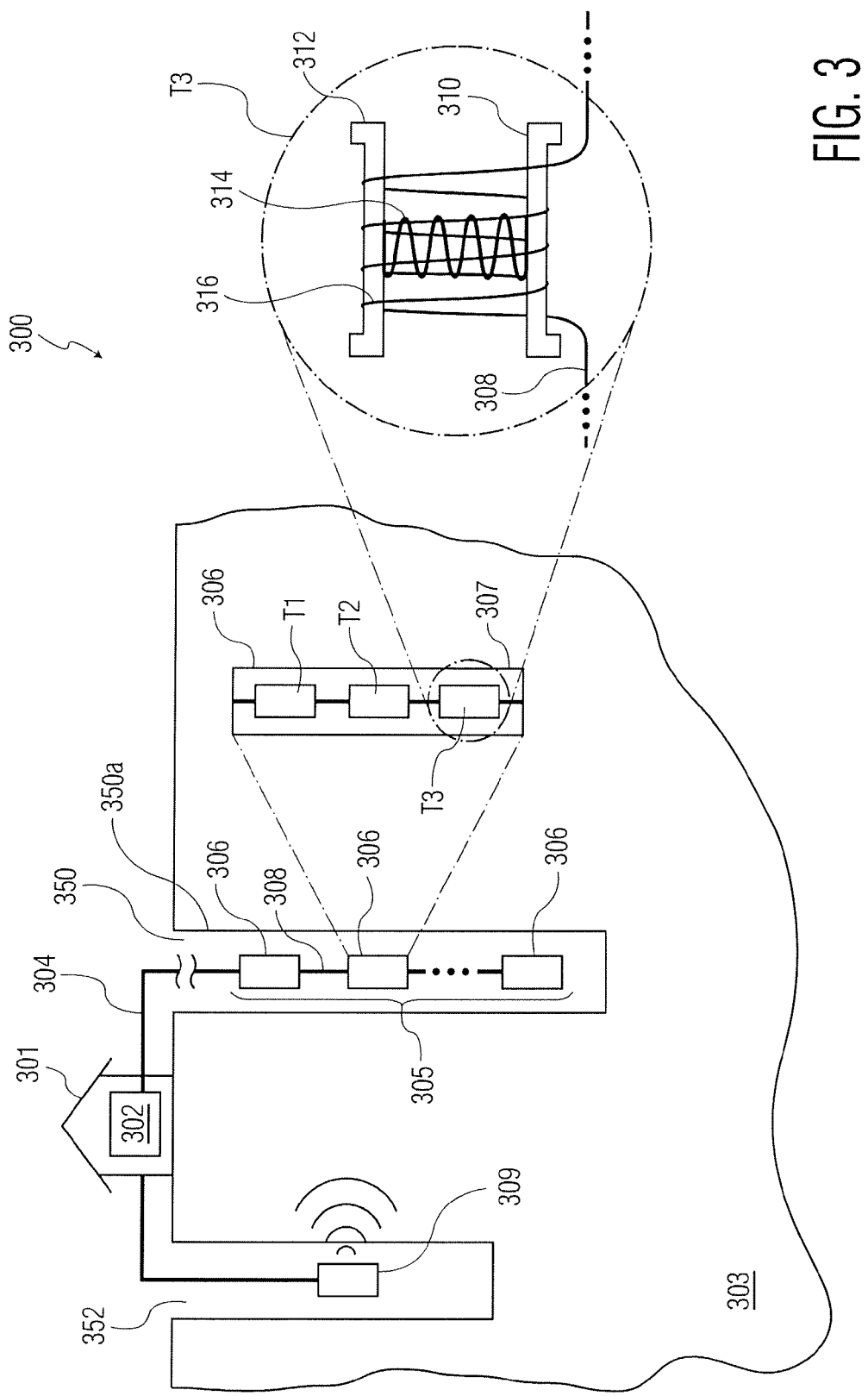
FIG. 3 is a block diagram of a downhole fiber optic sensing system in accordance with an exemplary embodiment of the present invention.

Rather than having a transducer/sensor array including one transducer at each sensing location, a plurality of transducers may be included at each location. The plurality of transducers at a given sensing location may be considered a "sensor". FIGS. 2-3 illustrate example of such systems.

Referring specifically to FIG. 2, fiber optic sensing system 200 includes a towed array in a marine application (i.e., towed by marine vessel 202). System 100 is a backscatter transducer-based system, and includes backscatter interrogator 202 (e.g., a Rayleigh backscatter interrogator) for interrogating backscatter optical signals from fiber optic sensor array 205. Sensor array 205 includes a plurality of fiber optic sensors 206. Each sensor 206 includes a plurality of fiber optic transducers T1, T2, and T3. While three (3) transducers are included in each sensor in FIG. 2 (where each transducer may be adapted to sense motion, vibration, etc. along one of the x, y, and z axes), any number of transducers may be included as desired in the given application. Backscatter interrogator 202 is optically coupled to sensor array 205 through optical lead cable 204 (where lead cable 204 includes at least one optical fiber to provide the optical coupling). In FIG. 2, lead cable 204 may be included in a tow cable. Ones of transducers 206 are optically coupled using optical interconnect cable 208 (where interconnect cable 208 includes at least one optical fiber to provide the optical coupling). At the end of array 205 is a drogue for providing hydrodynamic stability to array 205.

Each sensor 206 may include multiple wound fiber transducers (T1, T2, T3) separated by optical fiber which is sensitive to vibrations and bending. Interrogator 202 selects only segments of fiber within the sensors 206 to be interrogated. The data consisting of optical return signals from segments between sensors 206 may desirably be discarded without processing.

Similar to the process described above with respect to FIG. 1, pulses of highly coherent light propagate from an optical source of backscatter interrogator 202, through lead cable 204, and to sensor array 205. Backscatter (e.g., Rayleigh backscatter) occurs along the entire length of optical fiber within the array, and is returned to interrogator 202 as a temporal series of optical pulses. The pulses are received, processed and interpreted by interrogator 202. Interrogator 202 selects samples to be retained for processing (e.g., those corresponding to light scattered within sensors 206), and those which are excluded from processing (e.g., corresponding to light scattered between sensors 206).

Within each transducer T1, T2, T3 of each sensor 206, perturbations to the optical fiber change the intensity of the scattered light (e.g., the Rayleigh scattered light), a portion of which propagates back along lead cable 204 as a temporal light pulse to the Rayleigh interrogator. The transducers T1, T2, and T3 enhance the per meter sensitivity (scale factor) of the optical fiber to the perturbations. Examples of fiber optic transducers T1, T2, and T3 include fiber-wound transducers, air-backed mandrels, and coated fibers (e.g., a coiled length of optical fiber coated with an elastomeric material) wound on a rigid or flexible mandrel. Interrogation of the backscatter, versus interrogation of an interferometer (comprised of the transducer as a sensing leg), enables interrogation limited to only the length of fiber within a transducer/sensor (and excludes processing of return scattered light originating between transducers/sensors), and therefore results in reduced noise contributed by fiber outside of the transducers.

FIG. 3 illustrates a downhole (borehole) fiber optic sensing system 300. For example, system 300 may be a transducer borehole sensing system for microseismic monitoring, Vertical Seismic Profiling (VSP), etc. Borehole 350 is formed in earth 303, and is defined by casing 350a. Sound source 309 (a vibration source such as an air gun, sparker source, vibrator truck, an accelerated weight drop mechanism, an explosive charge, etc.) is provided below the surface in hole 352 (or at the surface if desired) to provide subsurface mapping capability, that is, to generate disturbances to be detected by sensor array 305. System 300 is a backscatter transducer-based system, and includes backscatter interrogator 302 (e.g., a Rayleigh backscatter interrogator in housing 301) for interrogating backscatter optical signals from fiber optic sensor array 305. Sensor array 305 (in borehole 350) includes a plurality of fiber optic sensors 306. Each sensor 306 includes a plurality of fiber optic transducers T1, T2, and T3 in housing 307. While three (3) transducers are included in each sensor in FIG. 3 (where each transducer may be adapted to sense motion, vibration, etc. along one of the x, y, and z axes), any number of transducers may be included as desired in the given application. The transducers in FIG. 3 include fiber optic accelerometers. For example, transducer T3 includes a fixed portion 310 configured to be secured to a body of interest, a moveable portion 312 configured to move with respect to the fixed portion along an axis, a spring 314 member positioned between fixed portion 310 and moveable portion 312, and an optical fiber 316 wound around and between fixed portion 310 and moveable portion 312. The detailed view of transducer T3 in FIG. 3 also illustrates interconnect cable 308 (including optical fiber 316) entering transducer T3. Exemplary fiber optic transducers and accelerometers, which may be used in connection with the present invention, are disclosed in U.S. Patent Application Publication No. 2012/0257208, titled "FIBER OPTIC TRANSDUCERS, FIBER OPTIC ACCELEROMETERS AND FIBER OPTIC SENSING SYSTEMS", which is hereby incorporated by reference in its entirety.

Backscatter interrogator 302 is optically coupled to sensor array 305 through optical lead cable 304 (where lead cable 304 includes at least one optical fiber to provide the optical coupling). Ones of sensors 306 are optically coupled using optical interconnect cable 308 (where interconnect cable 308 includes at least one optical fiber to provide the optical coupling).

Backscatter interrogator 302 launches pulsed light along lead cable 304, where it propagates to and from the sensor array 305 (e.g., a downhole tool string). Backscatter interrogator 302 selects fiber segments located within each sensor 306 for processing. The return light signals from the fiber segments between sensors 306 are "ignored". The configuration illustrated in FIG. 3 is also suitable other applications such as, for example: tunnel detection; tunneling activity detection; perimeter security; earthquake monitoring; weapons test monitoring; among other applications.

Figure 4:
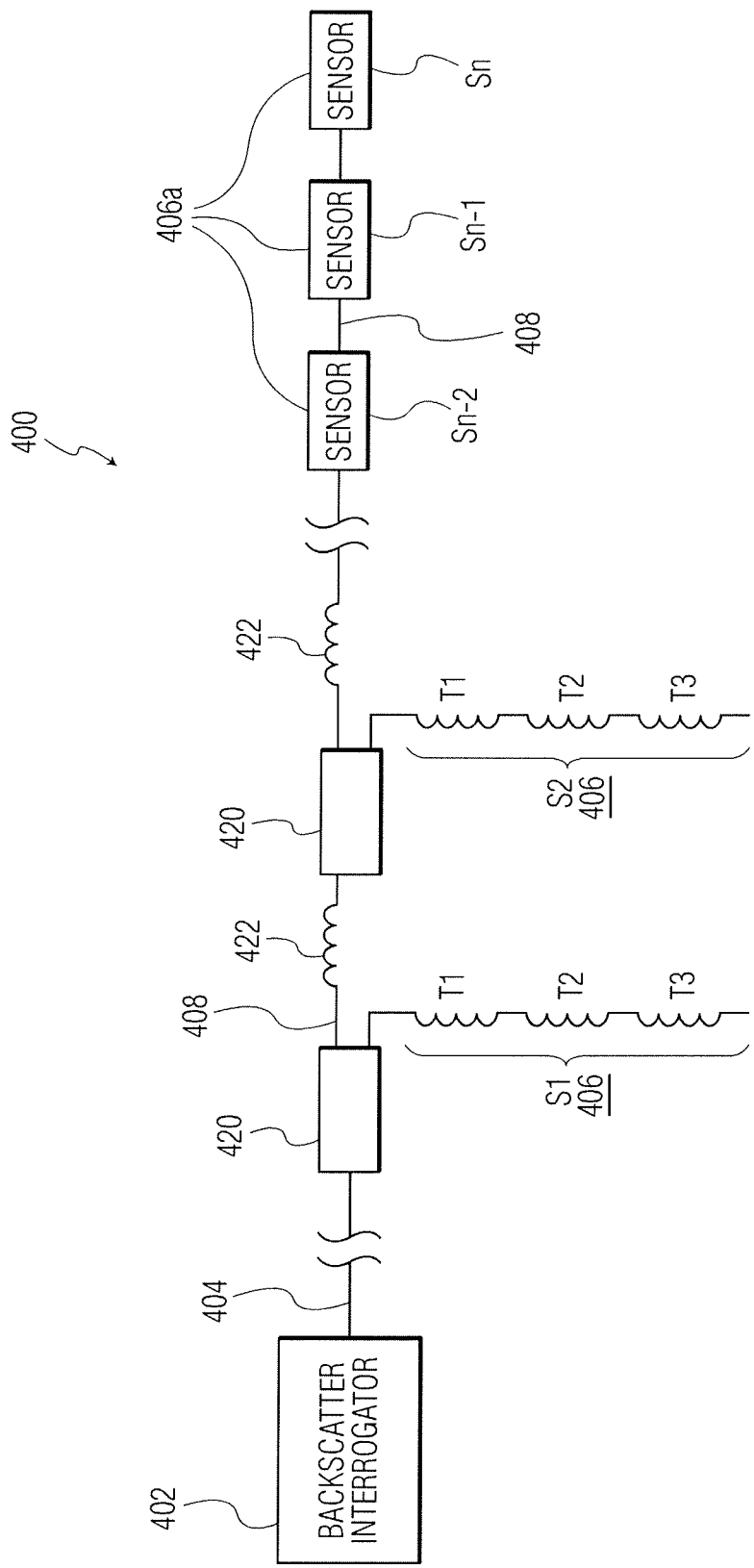
FIG. 4 is a block diagram of another fiber optic sensing system in accordance with an exemplary embodiment of the present invention.

FIG. 4 illustrates fiber optic sensing system 400 with 2 different sensors types (a first sensor type 406 in a branch, and a second sensor type 406a in an array. System 400 includes backscatter interrogator 402 and lead cable 404. Optical coupler 420 divides optical signals between sensor 406 (S1, a first branch including fiber optic transducers T1, T2, and T3) and the remainder of the sensed array beginning at interconnect cable 408. After delay coil 422, another optical coupler 420 divides optical signals between the next sensor 406 (S2, a second branch 406 including fiber optic transducers T1, T2, and T3) and the remainder of the sensed array beginning at another delay coil 422. Additional branches are contemplated. After the branches, the sensor array includes fiber optic sensors 406a (labeled Sn-2, Sn-1, Sn and connected with more interconnect cable 408), of a different type than sensors 406, provided for additional sensing. Sensors 406a may be any type of fiber optic sensor, including one or more transducers, including but not limited to those described herein. Backscatter interrogator 402 provides pulsed light that propagates along lead cable 404 to the sensor array. The sensor array is configured as a series of branches S1, S2, etc. Branches S1, S2, etc. are separated by interconnect cables 408 that include a delay coil 422 (e.g., where delay coil 422 may have a length equal to the length of fiber length in each branch) to ensure that the returned scatter pulses are separated and return to the interrogator in the proper sequence for demultiplexing.

Figure 5:
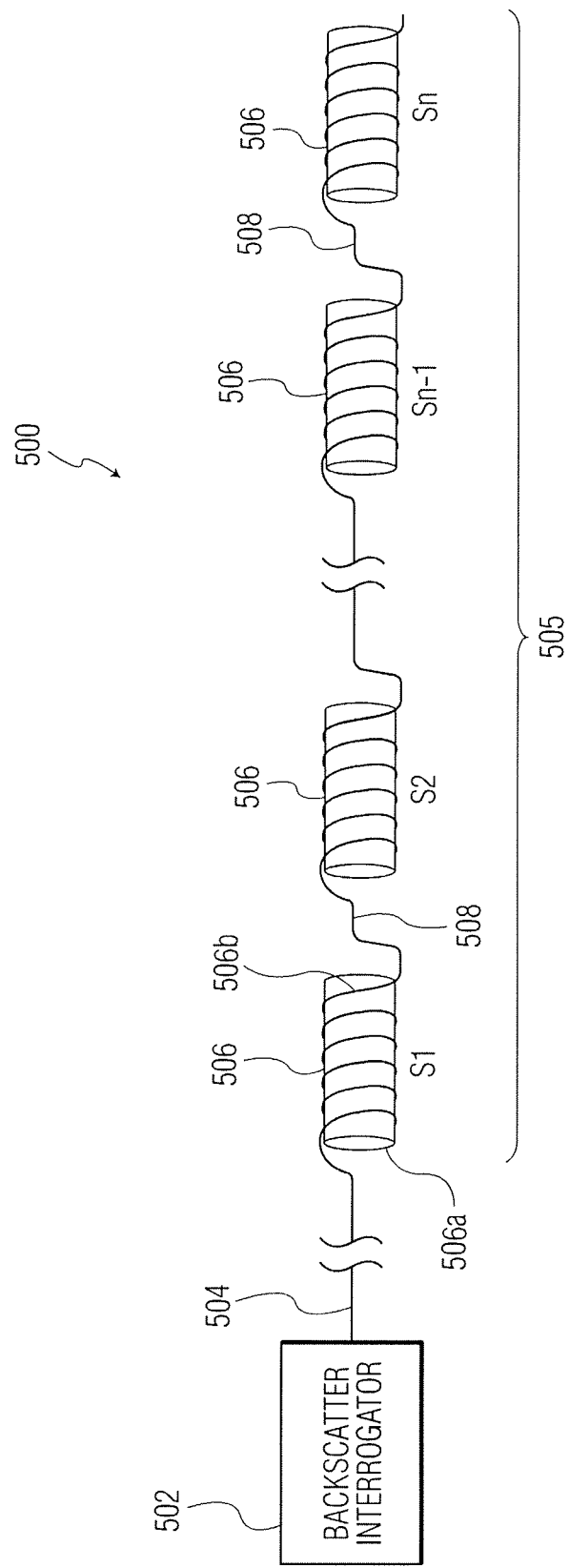
FIG. 5 is a block diagram of yet another fiber optic sensing system in accordance with an exemplary embodiment of the present invention.

FIG. 5 illustrates fiber optic sensing system 500, which is a backscatter pressure sensing system. System 500 includes backscatter interrogator 502 that pulses light that propagates along lead cable 504 to pressure sensing array 505. Array 505 includes fiber optic hydrophones (sensor/transducers 506 labeled as S1, S2, . . . , Sn-1, Sn, and separated by interconnect cable 508). Each sensor/transducer 506 may include, for example: (1) optical fiber-wrapped tubes (air-backed mandrels, as shown); or (2) wound, coated optical fiber, not shown. The example shown in FIG. 5 illustrates each sensor/transducer 506 with an optical fiber 506b wound on a mandrel 506a. The timing of retained and processed return scattered light pulses that propagate along lead cable 504 to backscatter interrogator 502 are selected such that, for example, only the samples representing scattered light from along the fiber within each sensor/transducer are processed, and the remainder of the samples are discarded.

An exemplary pulse width from a backscatter interrogator is on the order of 1-100 ns, and can yield a spatial resolution of ~1 m. To avoid coherent pulse-to-pulse interference, it is often preferable to limit the repetition rate of pulses to allowing the existence of only a single pulse in the sensor/transducer array at a time. An exemplary optical source has a narrow linewidth (~1 kHz) such as low phase noise lasers (fiber or semiconductor). An exemplary length of fiber within a transducer may be tens of meters over a total packaged length on the order of 0.02 to 1 m, providing over a packaged length of 2-10 cm, providing >100× increase in sensitivity, in addition to whatever gain is provided by the mechanical construction of the transducer. Exemplary backscatter interrogators include optical/electrical conversion at a low noise receiver, low noise amplification of the analog signal and digitizing of the analog signal. As provided above, the interrogator selects location(s) and length of fiber (based on in flight time of the light propagation) to be processed. An exemplary resolution is on the order of 1 nano-strain per root Hertz at 2 kHz over a gauge length on the order of ~0.5 m.

Exemplary applications for the sensing systems of the present invention include: (1) a sensing system for sensing earth motion in connection with a wellbore application, such as at least one of vertical seismic profiling, subsurface mapping, microseismic profiling, cross well imaging, microseismic event mapping, reservoir monitoring, steam flow monitoring, enhanced geothermal recovery, and gas migration; (2) a sensing system for sensing earth motion in connection with a perimeter security application such as intrusion detection, tunneling detection, tunnel mapping; and (3) a sensing system for sensing acoustic disturbances in connection with a marine application such as a towed marine array, a fixed marine array. Of course, additional applications are contemplated.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:
1. A fiber optic sensing system comprising:
a plurality of fiber optic sensors at distinct locations, each of the plurality of fiber optic sensors including at least one fiber optic transducer, wherein the fiber optic transducer includes a fixed portion configured to be secured to a body of interest, a moveable portion configured to move with respect to the fixed portion, a spring member positioned between the fixed portion and the moveable portion, and an optical fiber wound around and between the fixed portion and the moveable portion;
an optical backscatter interrogator for interrogating backscatter optical signals from the plurality of fiber optic sensors, the optical backscatter interrogator selecting samples of light from the plurality of fiber optic sensors for processing, the optical backscatter interrogator selecting samples of light scattered between the plurality of sensors for exclusion for processing; and
an optical fiber between the optical backscatter interrogator and the at least one fiber optic transducer,
wherein the plurality of fiber optic sensors includes (i) a first plurality of fiber optic sensors arranged in a parallel branch configuration with respect to one another, and (ii) a second plurality of fiber optic sensors arranged in a series configuration with respect to one another.

2. The fiber optic sensing system of claim 1 wherein the optical backscatter interrogator is a Rayleigh backscatter interrogator.

3. The fiber optic sensing system of claim 1 wherein the at least one fiber optic transducer includes a fiber optic transducer array including a plurality of fiber optic transducers.

4. The fiber optic sensing system of claim 1 wherein each of the plurality of fiber optic sensors includes a plurality of the fiber optic transducers.

5. The fiber optic sensing system of claim 4 wherein each of the plurality of fiber optic transducers of each of the plurality of fiber optic sensors is configured to sense motion along one of the plurality of distinct motion axes.

6. The fiber optic sensing system of claim 1 wherein the fiber optic transducer includes a coiled length of optical fiber.

7. The fiber optic sensing system of claim 1 wherein the fiber optic transducer includes a fiber optic accelerometer.

8. The fiber optic sensing system of claim 1 wherein the fiber optic sensing system is a sensing system for sensing earth motion in connection with a wellbore application.

9. The fiber optic sensing system of claim 8 wherein the wellbore application includes at least one of vertical seismic profiling, microseismic profiling, cross well imaging, microseismic event mapping, reservoir monitoring, steam flow monitoring, enhanced geothermal recovery, and gas migration.

10. The fiber optic sensing system of claim 1 wherein the fiber optic sensing system is a sensing system for sensing earth motion in connection with a perimeter security application.

11. The fiber optic sensing system of claim 1 wherein the fiber optic sensing system is a sensing system for sensing acoustic disturbances in connection with a marine application.

12. The fiber optic sensing system of claim 1 wherein the fiber optic sensing system is a pressure sensing system, and wherein the at least one fiber optic transducer includes an optical fiber wrapped around a hollow tube.

13. The fiber optic sensing system of claim 1 wherein the at least one fiber optic transducer includes a coiled length of optical fiber coated with an elastomeric material.

14. The fiber optic sensing system of claim 1 wherein the at least one fiber optic transducer is adapted to sense motion along a plurality of distinct motion axes.

15. The fiber optic sensing system of claim 1 further comprising an optical coupler between each of a plurality of branches of the first plurality of fiber optic sensors arranged in the parallel branch configuration.

16. The fiber optic sensing system of claim 15 further comprising a delay coil between ones of the plurality of branches for providing a time delay between backscattered optical signals received by the optical backscatter interrogator.

17. The fiber optic sensing system of claim 1 further comprising a vibration source to generate disturbances configured to be detected by the at least one fiber optic transducer.

18. A method of operating a fiber optic sensing system, the method comprising the steps of:
(a) providing a fiber optic sensor array including a plurality of fiber optic sensors at distinct locations, each of the plurality of fiber optic sensors including at least one fiber optic transducer for sensing a time varying physical quantity including at least one temperature, pressure, and vibration, the plurality of fiber optic sensors including (i) a first plurality of fiber optic sensors arranged in a parallel branch configuration with respect to one another, and (ii) a second plurality of fiber optic sensors arranged in a series configuration with respect to one another, wherein the fiber optic transducer includes a fixed portion configured to be secured to a body of interest, a moveable portion configured to move with respect to the fixed portion, a spring member positioned between the fixed portion and the moveable portion, and an optical fiber wound around and between the fixed portion and the moveable portion;
(b) generating an optical signal with an optical backscatter interrogator; and
(c) receiving, at the optical backscatter interrogator, a backscatter optical signal from the fiber optic sensor array, the receiving step including (i) selecting, by the optical backscatter interrogator, samples of light from the plurality of fiber optic sensors for processing, and (ii) selecting, by the optical backscatter interrogator samples, of light scattered between the plurality of sensors for exclusion for processing.

19. The method of claim 18 wherein the optical signal generated in step (b) is a pulse of highly coherent laser light.

20. The method of claim 18 further comprising the step of selecting samples of the backscatter optical signal for processing in order to determine the value of the physical quantity measured, the selected samples corresponding to light backscattered from the at least one fiber optic transducer of each of the plurality of fiber optic sensors.

* * * * *